United States Patent [19]

Mildner

[11] Patent Number: 4,958,597
[45] Date of Patent: Sep. 25, 1990

[54] PET RESTRAINT

[76] Inventor: Richard C. Mildner, 1040 San Dequito Dr., Encinitas, Calif. 92024

[21] Appl. No.: 444,991

[22] Filed: Dec. 4, 1989

[51] Int. Cl.⁵ .................................................. A01K 1/00
[52] U.S. Cl. ........................................ 119/109; 119/96
[58] Field of Search .................... 119/96, 106, 109; 24/265 CD; 54/34

[56] References Cited

U.S. PATENT DOCUMENTS

| | | | |
|---|---|---|---|
| 3,332,398 | 7/1967 | Mintz | 119/109 |
| 4,252,084 | 2/1981 | Willow | 119/109 X |
| 4,478,311 | 10/1984 | Anderson | 119/96 X |
| 4,584,967 | 4/1986 | Taplin | 119/109 |
| 4,879,972 | 11/1989 | Crowe et al. | 119/109 |

Primary Examiner—John J. Wilson
Assistant Examiner—R. Thomas Price
Attorney, Agent, or Firm—Ralph S. Branscomb

[57] ABSTRACT

A pet restraint has a single-stranded lower portion with a clip at the end to engage the pet's collar, and the upper portion branches into two separate strands having loops on the ends which can engage the restraint on the sidewalls of a pickup truck to keep the pet from falling out. The upper strands have hook-and-loop fastener means to join them together so that the entire length of the unit may be used as a single leash.

2 Claims, 1 Drawing Sheet

U.S. Patent  Sep. 25, 1990  4,958,597
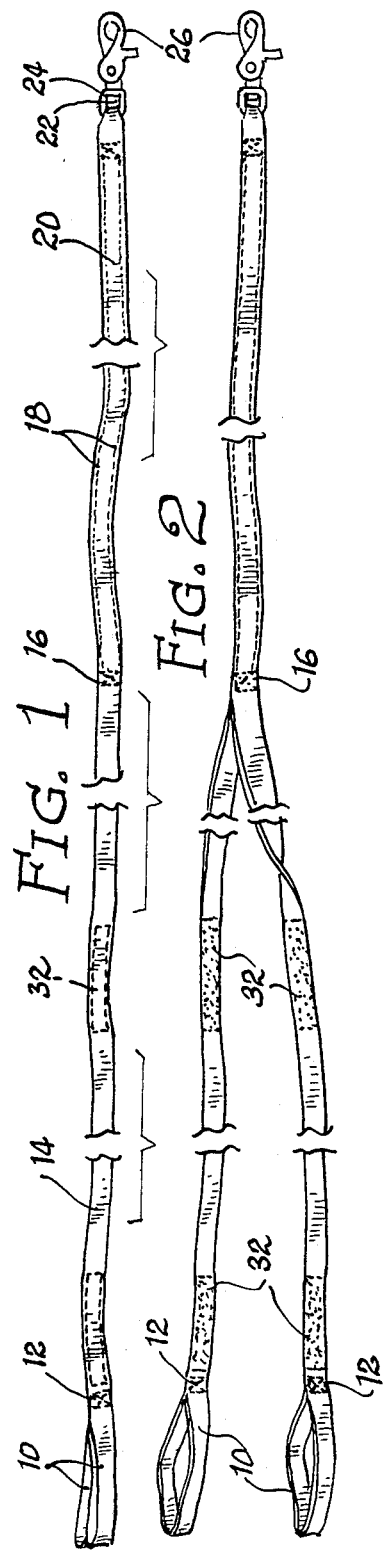
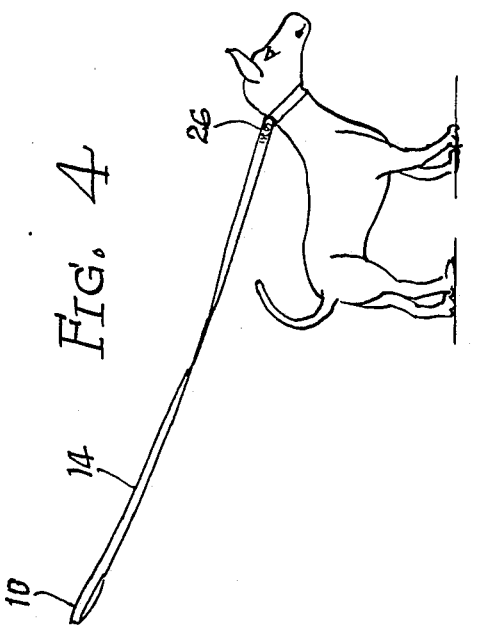
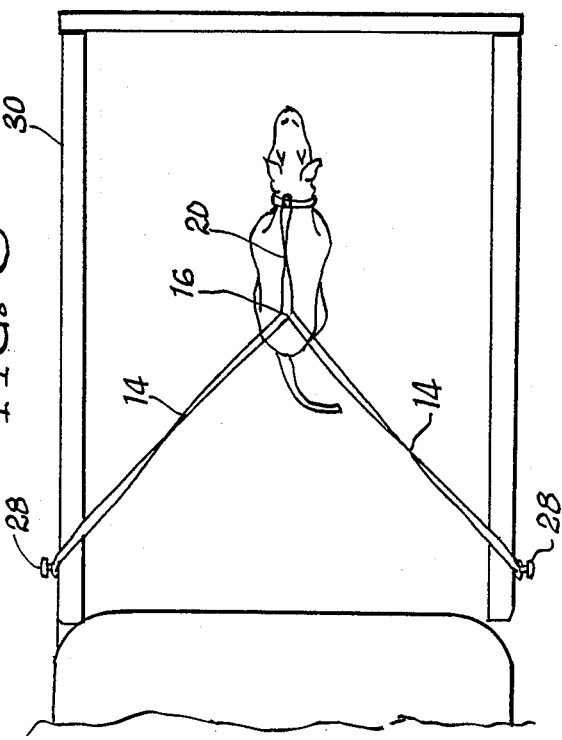

PET RESTRAINT

BACKGROUND OF THE INVENTION

It is very common, especially rural areas, to transport pets, generally dogs, in the beds of pickup trucks. The owners often think that the dog's common sense will prevent him from jumping, or falling, out of the bed.

However, this is often not the case. Dogs are not smart enough to anticipate velocity changes in the vehicle such as braking or accelerating, or swerving turns. Many dogs have been injured or killed in this manner.

A conventional leash is sometimes the only restraint that the owner has. When using the leash in the back of a pickup truck, however, there is a substantial risk that the pet may fall overboard anyway, and either get dragged along the pavement or hang himself, unless the leash is very thoughtfully anchored in the pickup bed.

In some states, this problem has become so aggravated that laws require the use of adequate restraint when pets are being transported in this manner. However, the law is often not enforced, and pet owners may think the flexible web net that replaces the tailgate is an adequate restraint. Of course, this net does no more, if as much, as the tailgate would were it up.

There is a need for an easily used and simple restraint which would completely eliminate the chance of the pet getting out of the truck bed, and preferably one which can be used as a leash when not used as a pickup truck restraint so that the owner will not have to carry a separate leash for use when he arrives at his destination.

SUMMARY OF THE INVENTION

The instant invention fulfills the above-stated need and comprises a Y-shaped restraint, the bottom of which has a clip to engage the dog's collar, and the upper, split portions of which engage restraints on the sidewalls of the pickup truck. The restraint is dimensioned such that the pet cannot reach the tailgate, and each of the upper, split portions, is too short to allow the pet to climb over the opposite side of the truck bed. Thus, all possibilities of escape are foreclosed to the pet.

The upper split portions of the leash mount patches of fastener material so that they may be fastened together to act as a single length. In this mode, the unit can be used as a simple leash so the collar clip need not be removed from the dog's collar upon arrival, but instead, the apparatus is disconnected from the sidewalls of the truck bed and used as a leash.

BRIEF DESCRIPTION OF THE DRAWINGS

FIG. 1 is a side elevation view of the pet restraint with the two upper leash portions fastened together;

FIG. 2 is an elevation view as in FIG. 1 but with the upper leash portions separated;

FIG. 3 is a diagrammatic top plan view illustrating the manner in which the pet is disabled from reaching any boundary of the pickup truck bed except the cab; and FIG. 4 illustrates the restraint in use as a leash.

DETAILED DESCRIPTION OF THE PREFERRED EMBODIMENT

The leash can be formed from a single Nylon strap, or any strong material adapted to be made into long straps, such as leather. The ends of the strap are each bent around to define loops 10 by stitching the very ends of the strap back on itself as at 12. The regions of the strap adjacent the end loop define upper leash portions 14 which converge together at 16 and are double-stitched together as indicated at 18 to form a very strong union of the two sides into a single, lower leash portion 20. Before this stitching was done, the strap was looped through the ring 22 of the swivel shackle 24 which mounts the collar clip 26.

Most trucks have some type of restraints, cleats, or at least stake holes, such as the diagrammatically illustrated restraints 28 along the upper edges of the truck bed sidewalls 30. As shown in FIG. 3, the loops 10 are engaged over these restraints. Obviously, they must be engaged securely enough that they will not come loose despite the constant tensioning, slacking, twisting, and shaking that the loop will experience due to the motion of the dog in the truck. One way to expedite making this attachment secure would be to at least partially line the insides of the loops with hook-and-loop fastener material so that they can be temporarily reduced in size to a very small aperture once they have been looped over the restraints.

In the preferred embodiment, spaced along the upper leash portions 14 are patches of mating hook-and-loop fasteners (velcro tm) 32. When the restraint is not in use in the bed of a pickup truck, these mating patches hold the leash together as a single unit as shown in FIG. 1. The owner can then engage both the loops 10 with one hand and use the restraint as a leash is shown in FIG. 4.

In yet a third mode of use, the restraint can be used as a leash held by two people, with one holding each of the loops. This would be very useful if the dog were very large and the owner very small, and no doubt it would be perceived as romantic by some couples when taking the dog out for an evening stroll in the park.

Thus, the restraint is simple to make and uses relatively inexpensive parts. Because it doubles as a leash, it is more likely to be used, and it no doubt would comply with all state laws regarding truck bed pet restraints.

I claim:
1. A pet restraint comprising:
   (a) a leash having an upper and lower end and a clip on its lower end for clipping onto the collar of a pet;
   (b) the upper end of said leash branching into two leash portions of substantially equal lengths;
   (c) the upper ends of said leash portions having means to engage respectively restraints on the opposite sides of the bed of a pickup truck;
   (d) means releasibly fastening said leash portions together along at least portions of their length such that said restraint mode can be used in a leash mode;
   (e) said means to engage at least one of said leash portions being a loop for use as a hand grip in said leash mode;
   (f) said means to restrain on each of said leash portions being a loop, and said loops overlying one another when in said leash mode to define a double-stranded hand grip grippable by a single hand; and,
   (g) said means releasably fastening said leash portions comprising mating patches of hook-and-loop fastener material mounted on respective opposite surfaces of said leash portions.

2. A pet restraint according to claim 1 wherein said leash portions are of substantially the same length as said lower end.

* * * * *